US009371920B2

(12) United States Patent
Coates, III et al.

(10) Patent No.: US 9,371,920 B2
(45) Date of Patent: Jun. 21, 2016

(54) MODULATING BALANCE PORTED THREE WAY VALVE

(71) Applicant: Parker-Hannifin Corporation, Cleveland, OH (US)

(72) Inventors: Gordon Richard Coates, III, Augusta, MO (US); Scott L. Kuhl, Saint Charles, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/766,282

(22) PCT Filed: Dec. 13, 2013

(86) PCT No.: PCT/US2013/075040
§ 371 (c)(1),
(2) Date: Aug. 6, 2015

(87) PCT Pub. No.: WO2014/126642
PCT Pub. Date: Aug. 21, 2014

(65) Prior Publication Data
US 2015/0377368 A1     Dec. 31, 2015

Related U.S. Application Data

(60) Provisional application No. 61/764,723, filed on Feb. 14, 2013.

(51) Int. Cl.
*F16K 11/048*     (2006.01)
*F16K 31/04*      (2006.01)
(52) U.S. Cl.
CPC ............... *F16K 11/048* (2013.01); *F16K 31/04* (2013.01)

(58) Field of Classification Search
USPC ........................................ 137/625.5; 251/282
See application file for complete search history.

(56) References Cited

U.S. PATENT DOCUMENTS 2,601,989 A * 7/1952 Modes ................... F16K 11/048
                                                    137/625.4
2,875,784 A * 3/1959 Cole ...................... F16K 39/022
                                                    137/625.25

(Continued)

FOREIGN PATENT DOCUMENTS

DE        41 11 064 A1    10/1992
EP        0 957 298 A1    11/1999

(Continued)

OTHER PUBLICATIONS

International Search Report and Written Opinion for corresponding patent application No. PCT/US2013/075040 dated Apr. 2, 2014.
International Preliminary Report on Patentability for corresponding patent application No. PCT/US2013/075040 dated May 29, 2015.

*Primary Examiner* — John Fox
(74) *Attorney, Agent, or Firm* — Renner, Otto, Boisselle & Sklar, LLP

(57) ABSTRACT

Provided is a three-way valve having and actuator (66) and first (100) and second (102) piston assemblies movable by the actuator (66) and arranged in tandem, wherein each piston assembly (100,102) has a backside (104,106) in fluid communication with a common pressure source for pressure balancing the piston assemblies (100,102). By having the backsides (104,106) in fluid communication with a common pressure source and by isolating the piston assemblies (100, 102) from a main chamber, an axial load on the actuator (66) is minimized, thereby allowing for more compact valve designs.

20 Claims, 7 Drawing Sheets

(56) References Cited

U.S. PATENT DOCUMENTS

| | | | | |
|---|---|---|---|---|
| 3,038,499 A | * | 6/1962 | Dumm | F16K 11/044 137/625.5 |
| 3,063,469 A | * | 11/1962 | Freeman | F16K 11/161 137/625.27 |
| 3,858,607 A | * | 1/1975 | Baker | F16K 11/044 137/625.5 |
| 4,442,998 A | * | 4/1984 | Ohyama | F16K 11/044 137/625.5 |
| 4,615,353 A | | 10/1986 | McKee | |
| 5,558,125 A | * | 9/1996 | Sell | F16K 11/044 137/625.27 |
| 2009/0283160 A1 | | 11/2009 | Fishwick et al. | |

FOREIGN PATENT DOCUMENTS

| | | |
|---|---|---|
| WO | 93/25832 A1 | 12/1993 |
| WO | 01/86178 A1 | 11/2001 |
| WO | 2004/072520 A1 | 8/2004 |

\* cited by examiner

MODULATING BALANCE PORTED THREE WAY VALVE

RELATED APPLICATIONS

This application is a national phase of International Application No. PCT/US2013/075040 filed Dec. 13, 2013 and published in the English language, which claims priority to U.S. Provisional Application No. 61/764,723 filed Feb. 14, 2013, which are hereby incorporated herein by reference.

FIELD OF INVENTION

The present invention relates generally to a flow control device, and more particularly to a valve for controlling the flow of fluid in a system

BACKGROUND

Flow control devices, such as motor controlled electric valves may be provided in heating/cooling systems to control the flow of fluid through the system. For example, motor controlled valves may be used at nodes of diverging loops of circuits to provide refrigerant for heat reclaim or for defrosting evaporators. The motor controlled valves may include a piston which is movable by an electric motor to vary the flow of fluid through the valve. The motor may be rotated by a signal sent by a controller. The motor rotates a gear train that is coupled to the piston to cause the piston to move.

SUMMARY OF INVENTION

The present invention provides a three-way valve having and actuator and first and second piston assemblies movable by the actuator and arranged in tandem, wherein each piston assembly has a backside in fluid communication with a common pressure source for pressure balancing the piston assemblies. By having the backsides in fluid communication with a common pressure source and by isolating the piston assemblies from a main chamber, an axial load on the actuator is minimized, thereby allowing for more compact valve designs.

According to one aspect of the invention, a modulating balance ported three-way valve is provided that includes a valve body having an inlet port, a chamber, and first and second outlet ports in fluidic communication with the inlet port via the chamber, an actuator having an output shaft, a connection rod disposed in the valve body and coupled to the actuator such that the actuator effects longitudinal movement of the connection rod, and first and second piston assemblies coupled to the connection rod and each having a backside in fluid communication with a common pressure source for pressure balancing the piston assemblies, wherein the first and second piston assemblies are movable between a first position allowing fluid entering the inlet port to flow through the first outlet and preventing fluid flow through the second outlet, a second position preventing fluid flow through the first outlet and allowing the fluid to flow through the second outlet, and a plurality of third positions allowing a varying amount of the fluid to flow through the first and second outlets.

The connection rod includes a passage in fluid communication with the backside of each piston assembly and the common pressure source.

The common pressure source is the fluid entering the inlet port.

The connection rod includes at least one port through which the fluid in the chamber enters the passage.

When the first and second piston assemblies are in the first position, the second piston assembly is seated against a second valve seat in the valve body, and when the first and second piston assemblies are in the second position, the first piston assembly is seated against a first valve seat in the valve body.

According to another aspect of the invention, a modulating balance ported three-way valve is provided that includes a valve body having an inlet port, a chamber, and first and second outlet ports in fluidic communication with the inlet port via the chamber, a connection rod disposed in the valve body and movable axially in the valve body, and first and second piston assemblies coupled to the connection rod and movable therewith to engage first and second seats respectively in the valve body, the first and second piston assemblies being axially spaced from one another such that while the first piston assembly is seated against the first seat to prevent fluid flow through the first outlet the second piston assembly is unseated from the second seat to allow fluid flow through the second outlet, while the second piston assembly is seated against the second seat to prevent fluid flow through the second outlet the first piston assembly is unseated from the first seat to allow fluid flow through the first outlet, and while the first and second piston assemblies are unseated from the first and second seats respectively fluid flows through both the first and second outlets.

Each of the first and second piston assemblies has a backside in fluid communication with a common pressure source for pressure balancing the piston assemblies.

The connection rod includes a passage in fluid communication with the backside of each piston assembly and the common pressure source.

The connection rod includes at least one port through which the fluid in the chamber enters the passage.

According to still another aspect of the invention, a method of modulating a three-way valve is provided, the valve having a valve body, an actuator, a connection rod disposed in the valve body and first and second piston assemblies arranged in tandem and coupled to the connection rod. The method includes controlling the tandem piston assemblies such that while the first piston assembly is seated against a first seat in the valve body to prevent fluid flow through a first outlet the second piston assembly is unseated from a second seat in the valve body to allow fluid flow through a second outlet, while the second piston assembly is seated against the second seat to prevent fluid flow through the second outlet the first piston assembly is unseated from the first seat to allow fluid flow through the first outlet, and while the first and second piston assemblies are unseated from the first and second seats respectively fluid flows through both the first and second outlets, and delivering fluid to a backside of each piston assembly in fluid communication with a common pressure source for pressure balancing the piston assemblies.

While the first and second piston assemblies are unseated from the first and second seats respectively, the method further includes controlling the tandem piston assembly to vary the percentage of flow between the outlets.

According to yet another aspect of the invention a modulating balance ported three way valve is provided that includes two balance ported piston assemblies, a connecting rod coupled to the ported piston assemblies having a passageway that is in fluid communication with a main chamber of the valve and respective sides of the piston assemblies opposite the main chamber of the valve to communicate pressure from the main chamber to the respective opposite sides of the pistons, and a motor actuator for controlling the position of the piston assemblies.

According to a further aspect of the invention, a modulating balance ported three-way valve is provided that includes a valve body having an inlet port, a chamber, and first and second outlet ports in fluidic communication with the inlet port via the chamber, an actuator having an output shaft, a connection rod disposed in the valve body and coupled to the actuator such that the actuator effects longitudinal movement of the connection rod, the connection rod including a passage, and first and second piston assemblies coupled to the connection rod, each piston assembly having a backside in fluid communication with the other backside via the passage for pressure balancing the piston assemblies.

The first and second piston assemblies are movable between a first position allowing fluid entering the inlet port to flow through the first outlet and preventing fluid flow through the second outlet, a second position preventing fluid flow through the first outlet and allowing the fluid to flow through the second outlet, and a plurality of third positions allowing a varying amount of the fluid to flow through the first and second outlets.

The foregoing and other features of the invention are hereinafter described in greater detail with reference to the accompanying drawings.

DETAILED DESCRIPTION

The principles of the present application have particular application to three-way valves for refrigeration and air conditioning systems and thus will be described below chiefly in this context. It will of course be appreciated, and also understood, that the principles of the invention may be useful in other fluid transfer applications where it is desirable to direct fluid to multiple outlets of a valve.

Figure 1:
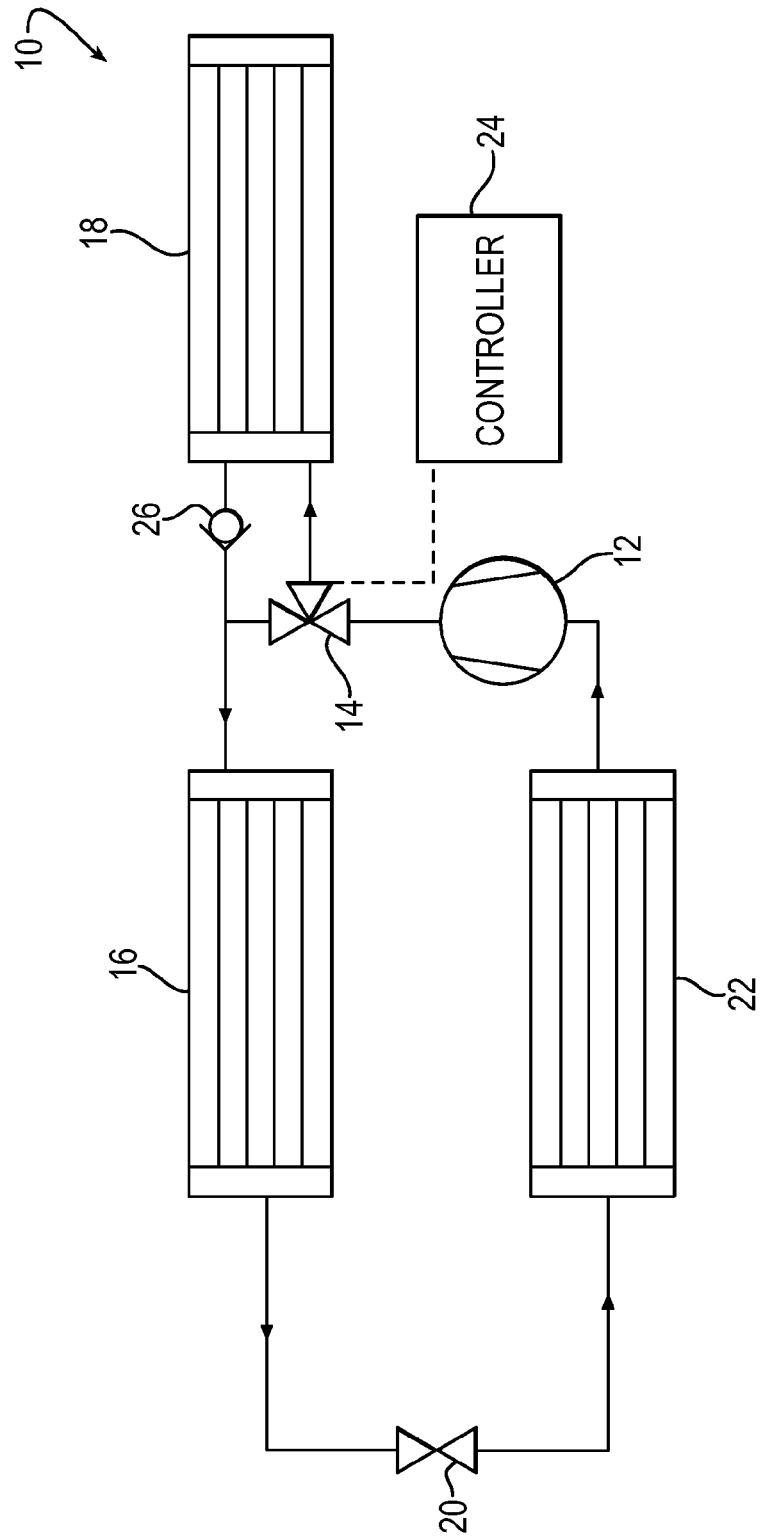
FIG. 1 is an exemplary heat reclaim system having a modulating balance ported three-way valve in accordance with aspects of the invention.

Turning now to FIG. 1, an exemplary heat reclaim system is shown generally at reference numeral 10. The system includes a compressor 12, a modulating balance ported three-way valve 14, a first condenser 16, a second condenser 18, an expansion device 20, an evaporator 22, and, controller 24, and a check valve 26 for preventing fluid flow from the condenser 16 to the condenser 18. The fluid flowing through the system, which may be a suitable refrigerant, such as a two-phase refrigerant, enters the compressor 12 and is compressed. The compressed fluid then flows to the three-way valve 14, which may deliver the fluid to one or both of the first and second condensers 16 and 18. Fluid delivered to the first and second condensers 16 and 18 is cooled and the heat rejected. The heat rejected from the second condenser 18, which may serve as a heat reclamation coil, is dissipated as useful heat and then the fluid flows to the first condenser 16. The fluid exits the first condenser 16 and flows to the expansion device 20 that expands the fluid to a low pressure liquid-vapor, and then the fluid flows to the evaporator 22 where heat is absorbed from a component, the environment, etc. The controller 24 may be provided to control the valve 14, and specifically an actuator of the valve 14 to control the flow of fluid exiting the valve.

Figure 2:
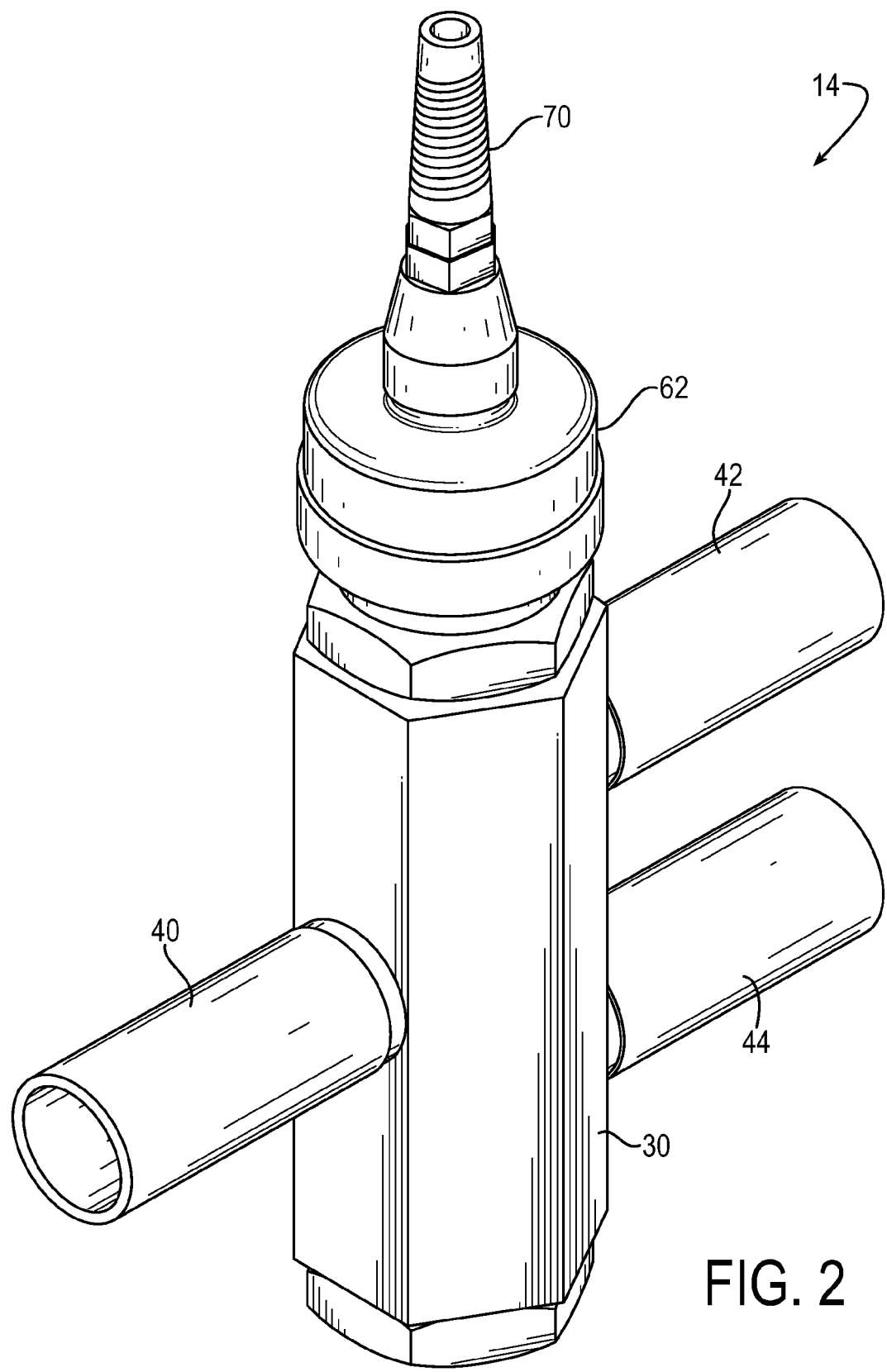
FIG. 2 is a perspective view of the exemplary modulating balance ported three-way valve.
Figure 3:
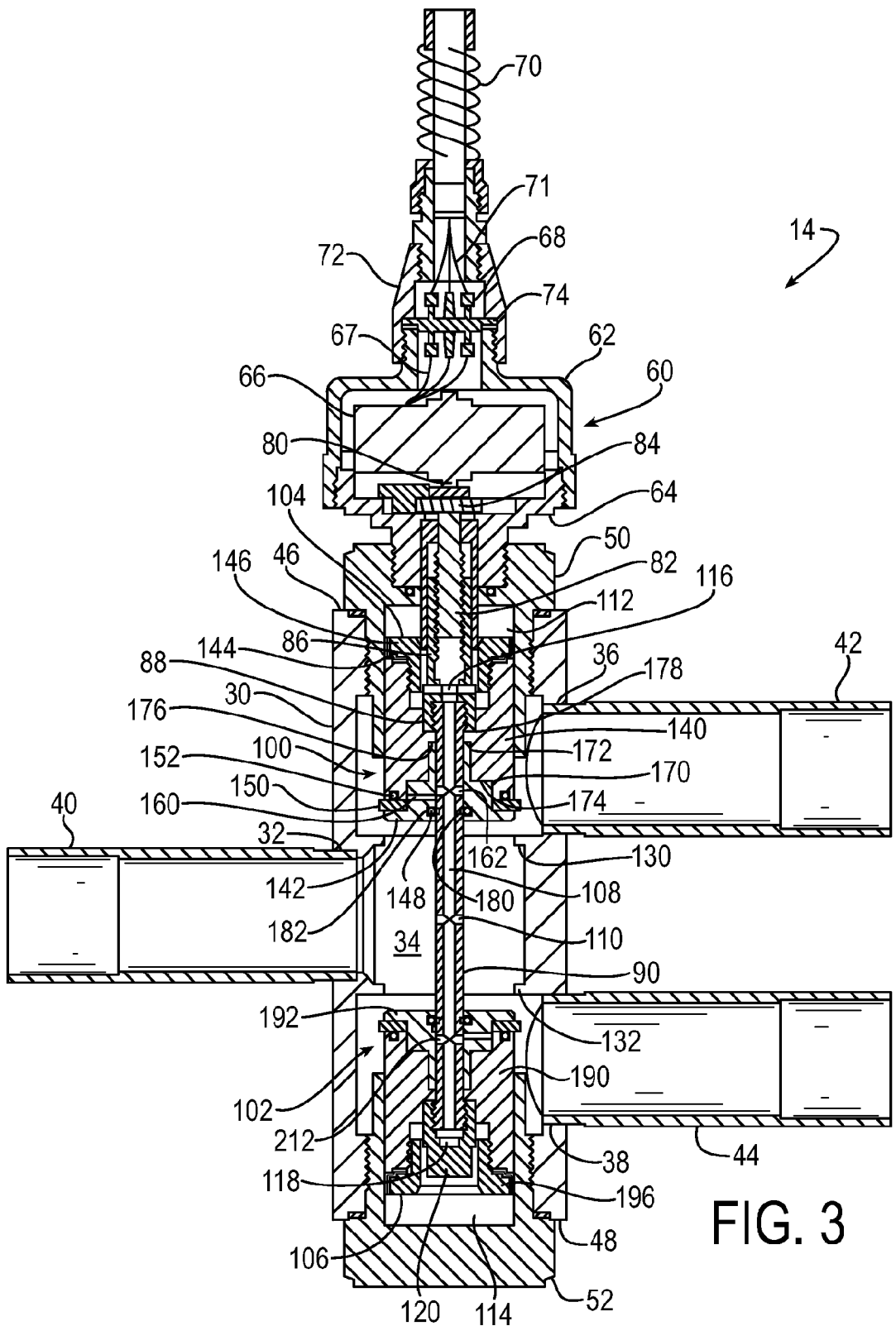
FIG. 3 is a cross-sectional view of the modulating balance ported three-way valve taken about line 3-3 in FIG. 2 showing piston assemblies in a first position.

Turning now to FIGS. 2 and 3, the valve 14 includes a valve body 30 having an inlet port 32, a chamber 34, and first and second outlet ports 36 and 38 in fluidic communication with the inlet port 32 via the chamber 34. The inlet port 32 and outlet ports 36 and 38 may be longitudinally spaced and have coupled thereto or integral therewith respective fluid conduits 40, 42 and 44. The valve body 30 may be open at its first and second ends 46 and 48, and the first end 46 may be closed by an adapter 50 and the second end 48 may be closed by a plug 52. The adapter 50 and plug 52 may be coupled to the valve body 30 in any suitable manner, such as by a threaded connection.

Coupled to the adapter 50 is a motor housing 60, which may include a top housing member 62 and a bottom housing member 64 coupled together and to the adapter 50 in any suitable manner, such as a threaded connection. The motor housing 60 may enclose a suitable actuator, such as a motor. In the illustrated embodiment, the motor housing 60 encloses a motor 66, such as an electric motor, such as an electric stepper motor. To provide power to the motor 66, the motor 66 may be coupled to pins 68 by suitable wires 67, and the pins 68 may be coupled to a strain relief 70 by suitable wires 71. The strain relief 70 is coupled to a nut 72 in any suitable manner, such as by a threaded connection, and the nut 72 is coupled to the top housing member 62 in any suitable manner, such as by a threaded connection. The pins 68 are constrained in sintered glass to isolate each pin, and the glass is constrained in a frame constrained between the nut 72 and the top housing member 62, which are sealed by a suitable seal, such as o-ring 74.

The motor 66 includes an output shaft 80 extending longitudinally towards the inlet and outlet ports 32, 34 and 36. The output shaft 80 is rotatably coupled to a drive screw 82 via a reduction gear assembly 84, such as a cluster gear assembly, and the drive screw 82 is coupled to a plunger 86. The plunger 86 is supported in the valve body 30 for longitudinal movement along the drive screw 82 such that rotation of the drive screw 82 effects longitudinal movement of the plunger 86. The plunger includes a head 88 coupled to a first end of a connection rod 90 in any suitable manner, such as a threaded connection, such that the connection rod 90 moves longitudinally with the plunger 86.

The connection rod 90 is disposed in the valve body 30 and coupled to first and second piston assemblies 100 and 102. The first piston assembly 100 is coupled to the first end of the connection rod 90 and the second piston assembly 102 is coupled to a second end of the connection rod 90. A backside 104, 106 of each piston assembly 100, 102, respectively, is in fluid communication with a common pressure source, for example the fluid entering the chamber 34 via the inlet port 32, to pressure balance the piston assemblies 100 and 102.

Fluid flowing through the chamber 34 enters a passage 108 in the connection rod 90 via one or more ports 110, which passage 108 is in fluid communication with the backside 104, 106 of each piston assembly 100, 102 and the common pressure source. The fluid then flows through the passage 108 to an area 112 between the backside 104 and the adapter 50, and to an area 114 between the backside 106 and the plug 52. The fluid flowing through the passage 108 may exit the passage 108 into the areas 112 and 114 via axial or radial passages at the ends of the connection rod 90, or via radial passages 116 and 118 in the plunger 86 and a retainer 120, respectively. The radial passages 116 and 118 may be, for example, cross-holes machined into the plunger 86 and retainer 120.

Figure 4:
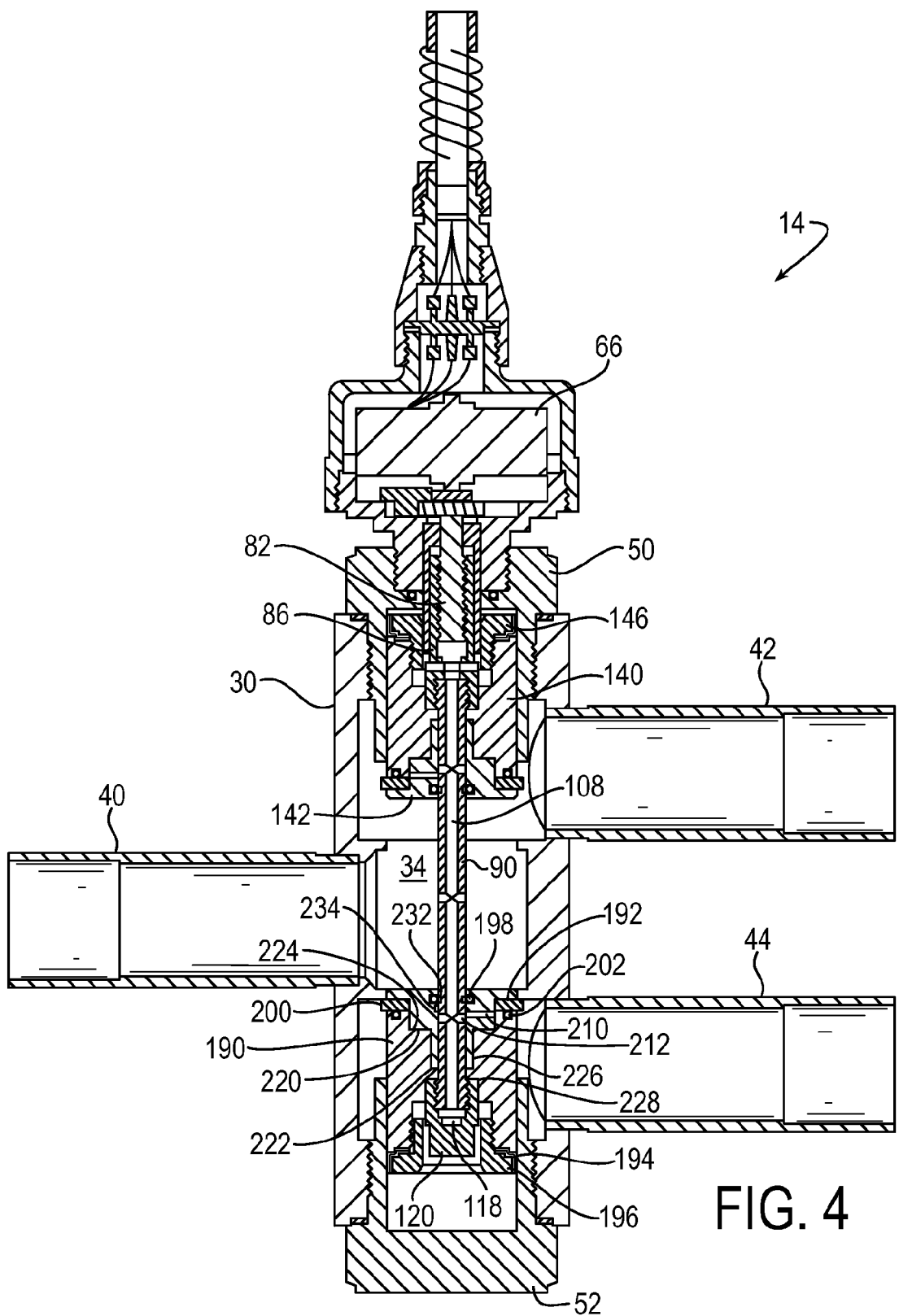
FIG. 4 is another cross-sectional view of the modulating balance ported three-way valve taken about line 3-3 in FIG. 2 showing the piston assemblies in a second position.
Figure 5:
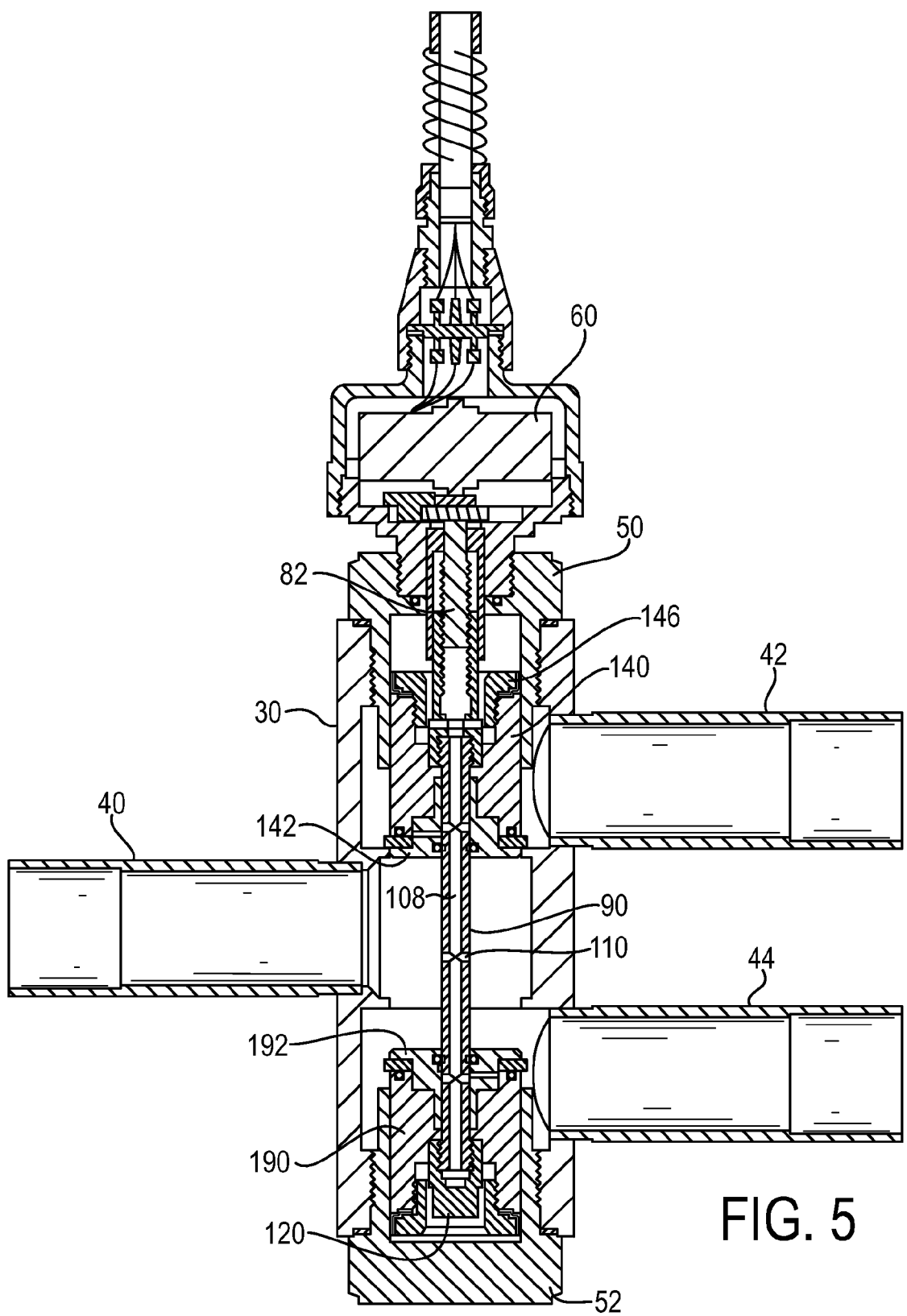
FIG. 5 is still another cross-sectional view of the modulating balance ported three-way valve taken about line 3-3 in FIG. 2 showing the piston assemblies in a third position.

The connection rod 90 is movable longitudinally to move the first and second piston assemblies 100 and 102 between a first position shown in FIG. 4, a second position shown in FIG. 5, and a plurality of third positions, one of which is shown in FIG. 3. When the first and second piston assemblies 100 and 102 are in the first position, fluid entering the inlet port 32 flows into the chamber 34 and exits the valve via the first outlet port 36, and the second piston assembly 102 is seated against a second valve seat 132 in the valve body 30 to prevent fluid flow through the second outlet port 38. When the first and second piston assemblies 100 and 102 are in the second position, fluid entering the inlet port 32 flows into the chamber 34 and exits the valve via the second outlet port 38, and the first piston assembly 100 is seated against a first valve seat 130 in the valve body 30 to prevent fluid flow through the first outlet port 36. When the first and second piston assemblies 100 and 102 are in one of the third positions, neither piston assembly 100 or 102 is seated against the respective valve seat 130, 132, thereby allowing a varying amount of the fluid to flow through the first and second outlet ports 36 and 38.

Referring now to the first piston assembly 100 in detail, the first piston assembly 100 includes a piston body 140 and a nose piece 142 through which an end of the connection rod 90 extends, a seal 144, such as a lip seal near the backside 104 for isolating the area 112 from the chamber 34 and for retaining the pressure from the common pressure source in the area 112, and a seal retainer 146 coupled to a backside of the piston body 140 to secure the seal between the piston body 140 and the seal retainer. The connection rod 90 may be sealed to the nose piece 142 in any suitable manner, such as by an o-ring 148, and the seal retainer 146 may be coupled to the piston body 140 in any suitable manner, such as by a threaded connection. The first piston assembly 100 may also include a seat disc 150 disposed between the nose piece 142 and the piston body 140, which is sealed to the piston body 140 in any suitable manner, such as by an o-ring 152.

To vent fluid in the passage 108 in the connection rod 90 to equalize pressure, the nose piece 142 includes a radial passage 160 in communication with the passage 108, for example by a radial passage 162 in the connection rod 90. The fluid vented from the passage 108 puts pressure on the backside of the o-ring 152, which prevents a large pressure drop by fluid flowing through the passage 108 and prevents the o-ring 152 from being blown out or being pushed in.

To connect the piston assembly 100 to the connection rod 90, the piston body 140 includes at least one ledge in the piston body, and in the illustrated embodiment first and second ledges 170 and 172 that are configured to be abutted by corresponding stepped portions 174 and 176 of the nose piece 142 and a third ledge 178 that is configured to be abutted by the plunger head 88. The nose piece 142 is inserted into the piston body 140 until the portions 174 and 176 abut the corresponding ledges 170 and 172, and the connection rod 90 is inserted through the nose piece 142 and the piston body 140. The end of the connection rod 90 is then coupled to the plunger head 88, such as by a threaded connection, causing the plunger head 88 to abut the ledge 178 and causing a stepped portion 180 of the connection rod 90 to abut a ledge 182 in the nose piece 142.

Referring now to the second piston assembly 102 in detail, the second piston assembly 102 includes a piston body 190 and a nose piece 192 through which an end of the connection rod 90 extends, a seal 194, such as a lip seal near the backside 106 for isolating the area 114 from the chamber 34 and for retaining the pressure from the common pressure source in the area 114, and a seal retainer 196 coupled to a backside of the piston body 190 to secure the seal between the piston body 190 and the seal retainer. The connection rod 90 may be sealed to the nose piece 192 in any suitable manner, such as by an o-ring 198, and the seal retainer 196 may be coupled to the piston body 190 in any suitable manner, such as by a threaded connection. The second piston assembly 102 may also include a seat disc 200 disposed between the nose piece 192 and the piston body 190, which is sealed to the piston body 190 in any suitable manner, such as by an o-ring 202.

To vent fluid in the passage 108 in the connection rod 90 to equalize pressure, the nose piece 192 includes a radial passage 210 in communication with the passage 108, for example by a radial passage 212 in the connection rod 90. The fluid vented from the passage 108 puts pressure on the backside of the o-ring 202, which prevents a large pressure drop by fluid flowing through the passage 108 and prevents the o-ring 202 from being blown out or being pushed in.

To connect the piston assembly 102 to the connection rod 90, the piston body 190 includes at least one ledge in the piston body, and in the illustrated embodiment first and second ledges 220 and 222 that are configured to be abutted by corresponding stepped portions 224 and 226 of the nose piece 192 and a third ledge 228 that is configured to be abutted by a retainer 230. The nose piece 192 is inserted into the piston body 190 until the portions 224 and 226 abut the corresponding ledges 220 and 222, and the connection rod 90 is inserted through the nose piece 192 and the piston body 190. The end of the connection rod 90 is then coupled to the retainer 230, such as by a threaded connection, causing the retainer 230 to abut the ledge 228 and causing a stepped portion 232 of the connection rod 90 to abut a ledge 234 in the nose piece 192.

During operation of the heat reclaim system 10, fluid flows from the compressor to the modulating balance ported three-way valve 14. To deliver refrigerant to the first condenser 16 and not the second condenser 18, the first and second piston assemblies 100 and 102 are moved axially until the second piston assembly, and specifically the seat disc 200 is seated against the valve seat 132 thereby preventing fluid flow through the second outlet port 38. When the second piston assembly 102 is seated against the valve seat 132, the first piston assembly 100 is not seated on the first valve seat 130 thereby allowing all of the flow entering the inlet port 32 to flow through the first outlet port 36, thereby bypassing the second condenser 18. The check valve 26 prevents fluid from flowing from the first condenser 16 to the second condenser 18.

To deliver refrigerant to the second condenser 18 and not the first condenser 16 the first and second piston assemblies 100 and 102 are moved axially until the first piston assembly, and specifically the seat disc 150 is seated against the valve seat 130 thereby preventing fluid flow through the first outlet port 36. When the first piston assembly 100 is seated against the valve seat 130, the second piston assembly 102 is not seated on the second valve seat 132 thereby allowing all of the flow entering the inlet port 32 to flow through the second outlet port 38, thereby bypassing the first condenser 16.

As the first and second piston assemblies 100 and 102, which have diameters that are substantially similar to the valve seats 130 and 132, are being moved, a portion of the fluid in the chamber 34 enters the passage 108 via the port 110 and flows to the areas 112 and 114, which are isolated from the chamber 34 by the seals 144 and 194, respectively, thereby minimizing the axial load on the actuator required to move the first and second piston assemblies 100 and 102. By reducing the axial load, smaller actuators may be used allowing for a more compact valve design.

To deliver refrigerant to both the first and second condensers 16 and 18 without having to use multiple valves, for example in a heat reclaim system where a precise amount of flow is desired to be delivered to the heat reclaim condenser 18, the connection rod 90 and thus the piston assemblies 100 and 102 are moved to one of the plurality of third positions. When in one of the third positions, a percentage of the flow entering the inlet port 32 flows through both the first and second outlet ports 36 and 38. The piston assemblies 100 and 102 may be moved to allow equal flow through both the outlet ports 36 and 38 or to positions allowing for varying flow through the outlet ports 36 and 38.

Figure 6:
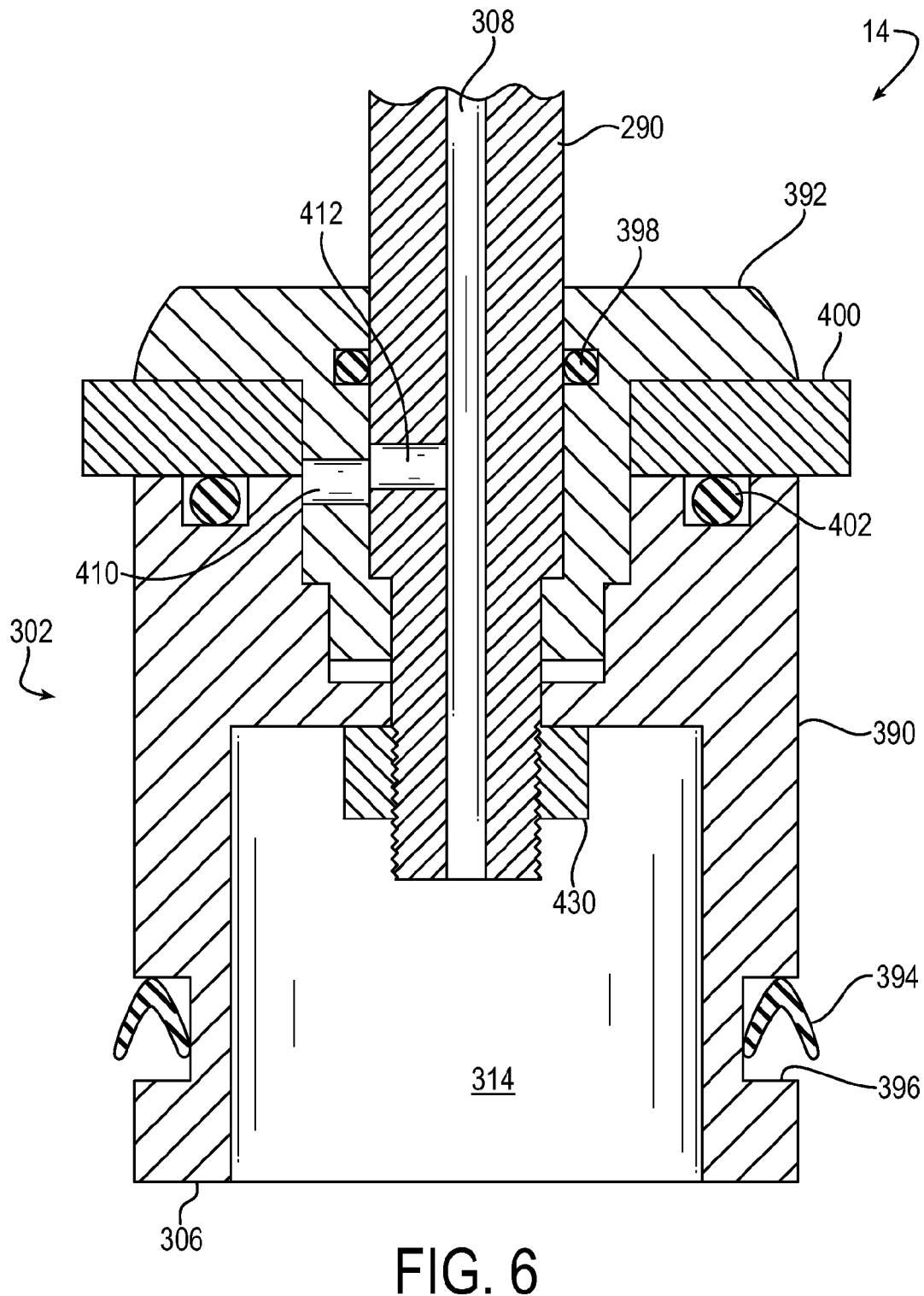
FIG. 6 is a partial cross-sectional view of a piston assembly and connection rod of an exemplary modulating balance ported three-way valve.

Turning now to FIG. 6, an exemplary embodiment of the second piston assembly of the modulating balance ported three-way valve 14 is shown at 302. The second piston assembly 302 is substantially the same as the above-referenced second piston assembly 102, and consequently the same reference numerals but indexed by 200 are used to denote structures corresponding to similar structures in the valve. In addition, the foregoing description of the second piston assembly 102 and components of the valve is equally applicable to the second piston assembly 302 except as noted below. Moreover, it will be appreciated upon reading and understanding the specification that aspects of the second piston assemblies may be substituted for one another or used in conjunction with one another where applicable.

The second piston assembly 302 includes a piston body 390 and a nose piece 392 through which an end of the connection rod 290 extends, a seal 394, such as a lip seal disposed in a seal groove 396 near the backside 306 for isolating the area 314 from the chamber 34 (FIG. 3) and for retaining the pressure from the common pressure source in the area 314. The connection rod 290 may be sealed to the nose piece 392 in any suitable manner, such as by an o-ring 398. The second piston assembly 302 may also include a seat disc 400 disposed between the nose piece 392 and the piston body 390, which is sealed to the piston body 390 in any suitable manner, such as by an o-ring 402.

To vent fluid in the passage 308 in the connection rod 290 to equalize pressure, the nose piece 392 includes a radial passage 410 in communication with the passage 308, for example by a radial passage 412 in the connection rod 290. The fluid vented from the passage 308 puts pressure on the backside of the o-ring 402, which prevents a large pressure drop by fluid flowing through the passage 308 and prevents the o-ring 402 from being blown out or being pushed in. To allow fluid flowing through the passage 308 to exit the passage directly into the area 314, the end of the connection rod 290 may extend beyond the retainer 430, which may be a nut.

Figure 7:
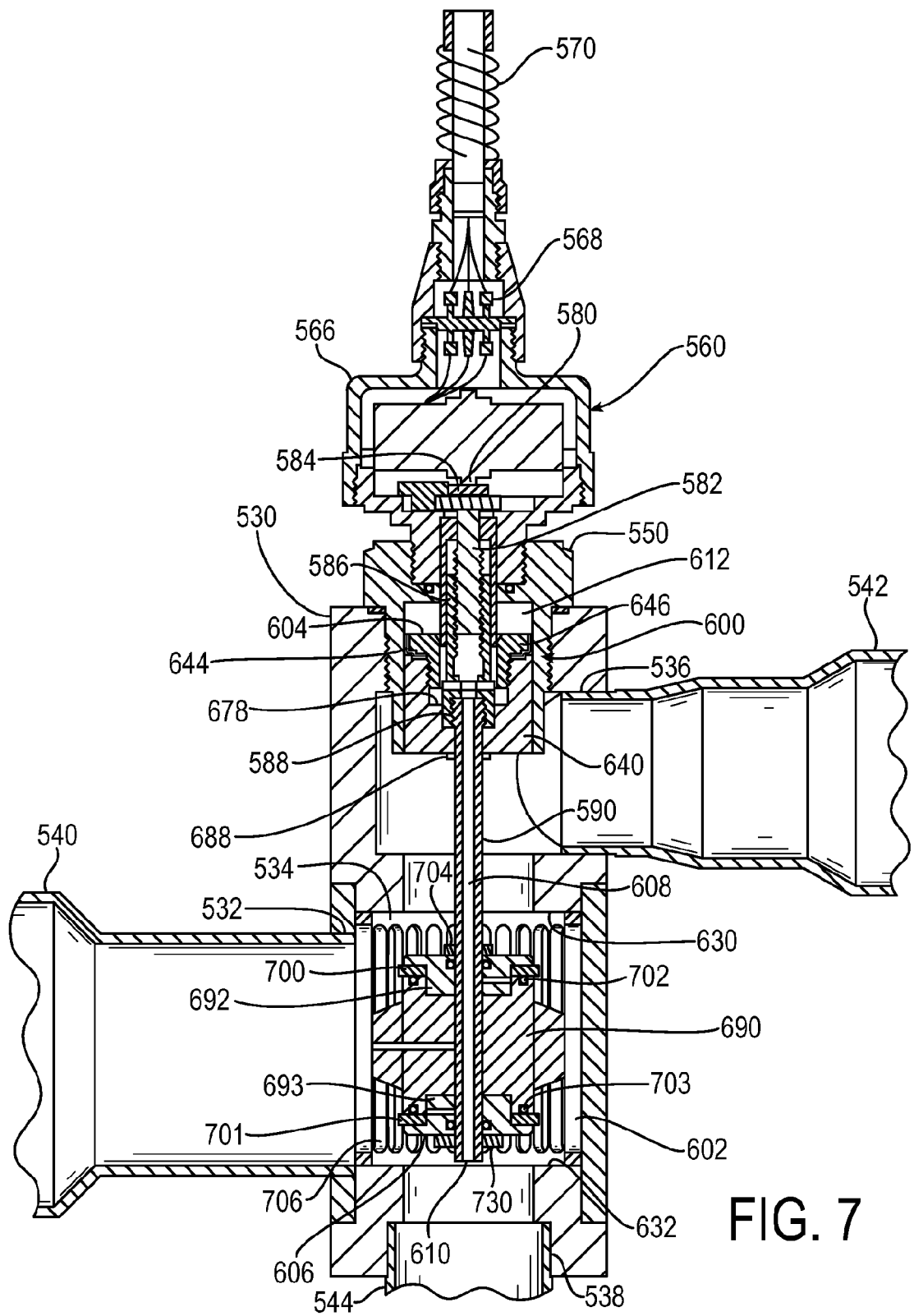
FIG. 7 is a cross-sectional view of another exemplary modulating balance ported three-way valve.

Turning now to FIG. 7, an exemplary embodiment of the modulating balance ported three-way valve is shown at 515. The modulating balance ported three-way 515 is substantially the same as the above-referenced modulating balance ported three-way 14, and consequently the same reference numerals but indexed by 500 are used to denote structures corresponding to similar structures in the valve. In addition, the foregoing description of the modulating balance ported three-way 14 is equally applicable to the modulating balance ported three-way 514 except as noted below. Moreover, it will be appreciated upon reading and understanding the specification that aspects of the valves may be substituted for one another or used in conjunction with one another where applicable.

The valve 514 includes a valve body 530 having an inlet port 532, a chamber 534, and first and second outlet ports 536 and 38 in fluidic communication with the inlet port 532 via the chamber 534. The inlet port 532 and outlet ports 536 and 538 may have coupled thereto or integral therewith respective fluid conduits 540, 542 and 544. The valve body 530 may be coupled to an adapter 550 in any suitable manner, such as by a threaded connection. Coupled to the adapter 550 is a motor housing 560 that encloses a suitable actuator, such as a motor 566 that is coupled be coupled to pins 568 by suitable wires (not shown), and the pins 568 may be coupled to a strain relief 570 by suitable wires (not shown).

The motor 566 includes an output shaft 580 extending longitudinally towards the inlet and outlet ports 532, 534 and 536. The output shaft 580 is rotatably coupled to a drive screw 582 via a reduction gear assembly 584, and the drive screw 582 is coupled to a plunger 586. The plunger includes a head 588 coupled to a first end of a connection rod 590 in any suitable manner, such as a threaded connection, such that the connection rod 590 moves longitudinally with the plunger 586.

The connection rod 590 is disposed in the valve body 530 and coupled to first and second piston assemblies 600 and 602. The first piston assembly 600 is coupled to the first end of the connection rod 590 and the second piston assembly 602 is coupled to a second end of the connection rod 590. A backside 604 of the piston assembly 600 is in fluid communication with a backside 606 of the piston assembly 602 via a passage 608 in the connection rod 590. The fluid enters the passage 608 via a port 610, and flows through the passage 608 to an area 612 between the backside 606 and the adapter 550.

The connection rod 590 is movable longitudinally to move the first and second piston assemblies 600 and 602 between a first position, a second position, and a plurality of third positions, one of which is shown in FIG. 7. When the first and second piston assemblies 600 and 602 are in the first position, fluid entering the inlet port 532 flows into the chamber 534 and exits the valve via the first outlet port 536, and a bottom portion of the second piston assembly 602 is seated against a second valve seat 632 in the valve body 530 to prevent fluid flow through the second outlet port 538. When the first and second piston assemblies 600 and 602 are in the second position, fluid entering the inlet port 532 flows into the chamber 534 and exits the valve via the second outlet port 538, and a top portion of the second piston assembly 602 is seated against a first valve seat 630 in the valve body 530 to prevent fluid flow through the first outlet port 536. When the first and second piston assemblies 600 and 602 are in one of the third positions, neither the top nor the bottom portion of the second piston assembly 602 is seated against the respective valve seat 630, 632, thereby allowing a varying amount of the fluid to flow through the first and second outlet ports 536 and 538.

Referring now to the first piston assembly 600 in detail, the first piston assembly 600 includes a piston body 640 through which an end of the connection rod 590 extends, a seal 644, such as a lip seal near the backside 604 for isolating the area 612 from the chamber 534 and for retaining the pressure from the passage 608 in the area 612, and a seal retainer 646 coupled to a backside of the piston body 640 to secure the seal between the piston body 640 and the seal retainer.

To connect the piston assembly 600 to the connection rod 590, the piston body 640 includes a ledge 678 in the piston body that is configured to be abutted by the plunger head 588.

The connection rod 590 is inserted through the piston body 640 and the end of the connection rod 590 is coupled to the plunger head 588, such as by a threaded connection, causing the plunger heat 588 to abut the ledge 678 and causing a radially outwardly projecting portion 688 of the connection rod 590 to abut the piston body 640.

Referring now to the second piston assembly 602 in detail, the second piston assembly 602 includes a piston body 690, an upper nose piece 692 and a lower nose piece 693 through which an end of the connection rod 590 extends, and a retainer 730 coupled to the end of the connection rod 590. The second piston assembly 602 may also include a seat disc 700 disposed between the nose piece 692 and the piston body 690 and a seat disc 701 disposed between the nose piece 693 and the piston body 690, which are sealed to the piston body 690 in any suitable manner, such as by respective o-rings 702 and 703. Each nose piece may optionally include a radial passage to vent fluid in the passage 608. A spacer 706 may be provided that surrounds the piston body 690 to guide the piston body 690, and a vent may extend through the piston body 690 to relieve pressure behind the seals.

To connect the piston assembly 602 to the connection rod 590, the upper and lower nose pieces 692 and 693 are inserted into the piston body 690 until respective portions on the nose pieces abut respective ledges in the piston body 690, and the connection rod 590 is inserted through the nose piece 692, the piston body 690, and the nose piece 693. The end of the connection rod 590 is then coupled to the retainer 730, such as by a threaded connection, causing the retainer 730 to abut the nose piece 693 and causing a radially outwardly projecting portion 704 of the connection rod 590 to abut the nose piece 692.

To deliver refrigerant to the first condenser 16 and not the second condenser 18, the first and second piston assemblies 600 and 602 are moved axially until the seat disc 701 is seated against the valve seat 632 to prevent fluid flow through the second outlet port 538. When the seat disc 701 is seated against the valve seat 632, the seat disc 700 is not seated on the first valve seat 630, thereby allowing all of the flow entering the inlet port 532 to flow through the first outlet port 536, thereby bypassing the second condenser 18. Pressure between the inlet port 532 and the outlet port 536 acts on the bottom portion of the first piston assembly 600 and the top portion of the second piston assembly 602, and pressure in the outlet port 538 and chamber 534 below the second piston assembly 602 enters the passage 608 and flows to the area 612 to pressure balance the piston assemblies.

To deliver refrigerant to the second condenser 18 and not the first condenser 16, the first and second piston assemblies 600 and 602 are moved axially until the seat disc 700 is seated against the valve seat 630 thereby preventing fluid flow through the first outlet port 536. When the seat disc 700 is seated against the valve seat 630, the seat disc 701 is not seated on the second valve seat 632, thereby allowing all of the flow entering the inlet port 532 to flow through the second outlet port 538, thereby bypassing the first condenser 16. Pressure in the outlet port 536 and chamber 534 above the second piston assembly 602 acts on the bottom portion of the first piston assembly 600 and the top portion of the second piston assembly 602, and pressure from the fluid flowing through the outlet port 538 enters the passage 608 and flows to the area 612 to pressure balance the piston assemblies.

To deliver refrigerant to both the first and second condensers 16 and 18, the connection rod 590 and thus the piston assemblies 600 and 602 are moved to one of the plurality of third positions shown in FIG. 7. When in one of the third positions, a percentage of the flow entering the inlet port 532 flows through both the first and second outlet ports 536 and 538. The piston assemblies 600 and 602 may be moved to allow equal flow through both the outlet ports 536 and 538 or to positions allowing for varying flow through the outlet ports 536 and 538.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A modulating balance ported three-way valve including:
   a valve body having an inlet port, a chamber, and first and second outlet ports in fluidic communication with the inlet port via the chamber;
   an actuator having an output shaft;
   a connection rod disposed in the valve body and coupled to the actuator such that the actuator effects longitudinal movement of the connection rod, the connection rod including a passage; and
   first and second piston assemblies coupled to the connection rod, each piston assembly having a backside in fluid communication with the other backside via the passage in the connection rod for pressure balancing the piston assemblies.

2. The modulating balance ported three-way valve according to claim 1, wherein the first and second piston assemblies are movable between a first position allowing fluid entering the inlet port to flow through the first outlet and preventing fluid flow through the second outlet, a second position preventing fluid flow through the first outlet and allowing the fluid to flow through the second outlet, and a plurality of third positions allowing a varying amount of the fluid to flow through the first and second outlets.

3. The modulating balance ported three-way valve according to claim 1, wherein each backside is in fluid communication with a common pressure source and the common pressure source is the fluid entering the inlet port.

4. The modulating balance ported three-way valve according to claim 3, wherein the connection rod includes at least one port through which the fluid in the chamber enters the passage.

5. The modulating balance ported three-way valve according to claim 2, wherein the connection rod includes a port near each end of the connection rod in communication with a respective passage in the piston assemblies for venting fluid.

6. The modulating balance ported three-way valve according to claim 2, wherein each piston assembly includes a seal near the backside of the respective piston assembly for retaining the pressure from the common pressure source.

7. The modulating balance ported three-way valve according to claim 6, wherein each piston assembly includes a piston body through which an end of the connection rod extends and the seal near the backside of the respective piston assembly.

8. The modulating balance ported three-way valve according to claim 7, wherein each piston assembly further includes a seal retainer coupled to a backside of the respective piston to secure the seal.

9. The modulating balance ported three-way valve according to claim 7, wherein each piston assembly further includes a nose piece coupled to the respective piston, each nose piece having a passage in communication with the passage in the connection rod for venting fluid.

10. The modulating balance ported three-way valve according to claim 7, wherein the second piston assembly further includes a retainer coupled to the respective end of the connection rod to couple the second piston assembly to the connection rod.

11. The modulating balance ported three-way valve according to claim 1, wherein the actuator is an electric motor.

12. The modulating balance ported three-way valve according to claim 10, wherein the electric motor is a stepper motor.

13. The modulating balance ported three-way valve according to claim 11, wherein the motor has an output shaft and the connection rod is coupled to the output shaft of the motor such that rotation of the output shaft effects longitudinal movement of the connection rod.

14. The modulating balance ported three-way valve according to claim 13, further including a drive screw rotatably coupled to the output shaft via a reduction gear assembly, and a plunger supported in the valve body for longitudinal movement along the drive screw, wherein a head of the plunger is coupled to an end of the connection rod.

15. The modulating balance ported three-way valve according to claim 1, further including a plug for closing one end of the valve body and an adapter secured to a motor housing for closing another end of the valve body.

16. The modulating balance ported three-way valve according to claim 15, wherein a chamber is formed between the adapter and the backside of the first piston assembly for receiving fluid from the common pressure source and a chamber is formed between the plug and the backside of the second piston assembly for receiving fluid from the common pressure source.

17. The modulating balance ported three-way valve according to claim 1, wherein when the first and second piston assemblies are in the first position, the second piston assembly is seated against a second valve seat in the valve body, and when the first and second piston assemblies are in the second position, the first piston assembly is seated against a first valve seat in the valve body.

18. A method of modulating a three-way valve having a valve body, an actuator, a connection rod disposed in the valve body and first and second piston assemblies arranged in tandem and coupled to the connection rod, the method including:

controlling the tandem piston assemblies such that while the first piston assembly is seated against a first seat in the valve body to prevent fluid flow through a first outlet the second piston assembly is unseated from a second seat in the valve body to allow fluid flow through a second outlet, while the second piston assembly is seated against the second seat to prevent fluid flow through the second outlet the first piston assembly is unseated from the first seat to allow fluid flow through the first outlet, and while the first and second piston assemblies are unseated from the first and second seats respectively fluid flows through both the first and second outlets; and pressure balancing the piston assemblies by using a passage in the connection rod that effects fluid communication between the backsides of the piston assemblies.

19. The method according to claim 18, wherein while the first and second piston assemblies are unseated from the first and second seats respectively, the method further includes controlling the tandem piston assembly to vary the percentage of flow between the outlets.

20. A modulating balance ported three way valve comprising two balance ported piston assemblies, a connecting rod coupled to the ported piston assemblies having a passageway that is in fluid communication with a main chamber of the valve and respective sides of the piston assemblies opposite the main chamber of the valve to communicate pressure from the main chamber to the respective opposite sides of the pistons, and a motor actuator for controlling the position of the piston assemblies.

* * * * *